(12) United States Patent
Aktas et al.

(10) Patent No.: US 12,384,279 B2
(45) Date of Patent: Aug. 12, 2025

(54) VEHICLE SEATING ASSEMBLY WITH LOCKOUT CAM

(71) Applicant: Ford Global Technologies, LLC, Dearborn, MI (US)

(72) Inventors: Macit Aktas, Windsor (CA); Joshua Gauthier, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 496 days.

(21) Appl. No.: 18/075,719

(22) Filed: Dec. 6, 2022

(65) Prior Publication Data

US 2024/0181940 A1    Jun. 6, 2024

(51) Int. Cl.
*B60N 2/235* (2006.01)
*B60N 2/12* (2006.01)
*B60N 2/30* (2006.01)

(52) U.S. Cl.
CPC ............ *B60N 2/2358* (2013.01); *B60N 2/12* (2013.01); *B60N 2/3009* (2013.01); *B60N 2/3065* (2013.01)

(58) Field of Classification Search
CPC ....... B60N 2/2358; B60N 2/3065; B60N 2/12
See application file for complete search history.

(56) References Cited

U.S. PATENT DOCUMENTS

| | | | |
|---|---|---|---|
| 9,308,834 B2 | 4/2016 | Tame et al. | |
| 9,868,369 B1 | 1/2018 | Aktas | |
| 9,908,442 B2 | 3/2018 | Aktas | |
| 10,252,644 B2 | 4/2019 | Aktas | |
| 2010/0289313 A1* | 11/2010 | Moegling | B60N 2/3065 297/335 |
| 2020/0223327 A1* | 7/2020 | Aktas | |
| 2022/0161696 A1 | 5/2022 | Agalave et al. | |

* cited by examiner

*Primary Examiner* — Anthony D Barfield
(74) *Attorney, Agent, or Firm* — Vichit Chea; Price Heneveld LLP

(57) ABSTRACT

A vehicle seating assembly includes a mounting bracket, a seat, a seatback, and a cam assembly. The seat is rotatably coupled to the mounting bracket. The seatback is rotatably coupled to the mounting bracket. The seatback includes a protrusion. The cam assembly is rotatably coupled to the mounting bracket. The cam assembly includes a lockout cam having a first end and a second end. The first end of the lockout cam engages with the protrusion of the seatback such that movement of the seatback relative to the mounting bracket is restricted in a first non-use state. The second end of the lockout cam engages with the seat such that movement of the seat relative to the mounting bracket is restricted in a second non-use state.

15 Claims, 16 Drawing Sheets

VEHICLE SEATING ASSEMBLY WITH LOCKOUT CAM

FIELD OF THE DISCLOSURE

The present disclosure generally relates to vehicles. More specifically, the present disclosure relates to vehicle seating assemblies.

BACKGROUND OF THE DISCLOSURE

Consumers often compare available features and functionality between vehicles when making a purchasing decision. Accordingly, additional solutions are needed that provide features and functionality that are desirable to consumers.

SUMMARY OF THE DISCLOSURE

According to a first aspect of the present disclosure, a vehicle seating assembly includes a mounting bracket, a seat, a seatback, and a cam assembly. The seat is rotatably coupled to the mounting bracket. The seatback is rotatably coupled to the mounting bracket. The seatback includes a protrusion. The cam assembly is rotatably coupled to the mounting bracket. The cam assembly includes a lockout cam having a first end and a second end. The first end of the lockout cam engages with the protrusion of the seatback such that movement of the seatback relative to the mounting bracket is restricted in a first non-use state. The second end of the lockout cam engages with the seat such that movement of the seat relative to the mounting bracket is restricted in a second non-use state.

Embodiments of the first aspect of the disclosure can include any one or a combination of the following features:
- the lockout cam is biased toward an engaged position;
- the engaged position of the lockout cam is defined as physical contact between the first end of the lockout cam and the protrusion of the seatback in the first non-use state;
- the engaged position of the lockout cam is defined as physical contact between the second end of the lockout cam and the seat in the second non-use state;
- an actuation cam that is configured to engage with a stationary structure below the vehicle seating assembly, wherein a position of the vehicle seating assembly relative to the stationary structure dictates a position of the actuation cam;
- the stationary structure is at least a portion of a track assembly to which the vehicle seating assembly is configured to be mounted;
- a cable that extends between the actuation cam and the lockout cam such that the position of the actuation cam influences whether the lockout cam is in the engaged position or a disengaged position;
- the actuation cam is configured to disengage with a top surface of the stationary structure when the vehicle seating assembly is in at least one of the first non-use state and the second non-use state;
- engagement between the actuation cam and a top surface of the stationary structure places the actuation cam in a position that provides a force to the cable that counteracts the biasing of the lockout cam to the engaged position;
- disengagement of the actuation cam with the top surface of the stationary structure causes a slackening of the cable that extends between the actuation cam and the lockout cam, and wherein such slackening of the cable allows the biasing of the lockout cam to place the lockout cam in the engaged position;
- the first non-use state results in actuation of a track release button and an interlock release button of a track assembly to which the vehicle seating assembly is configured to be mounted;
- the second non-use state results in actuation of the interlock release button;
- the first non-use state places the seatback in a position that prevents occupancy of the vehicle seating assembly; and
- the second non-use state places the seat in a position that prevents occupancy of the vehicle seating assembly.

According to a second aspect of the present disclosure, a vehicle seating assembly includes a mounting bracket, a seat, a seatback, a cam assembly, an actuation cam, and a cable. The seat is rotatably coupled to the mounting bracket. The seatback is rotatably coupled to the mounting bracket. The seatback includes a protrusion. The cam assembly is rotatably coupled to the mounting bracket. The cam assembly includes a lockout cam that is biased toward an engaged position. The lockout cam includes a first end and a second end. The first end of the lockout cam engages with the protrusion of the seatback such that movement of the seatback relative to the mounting bracket is restricted in a first non-use state. The engaged position of the lockout cam is defined as physical contact between the first end of the lockout cam and the protrusion of the seatback in the first non-use state. The second end of the lockout cam engages with the seat such that movement of the seat relative to the mounting bracket is restricted in a second non-use state. The engaged position of the lockout cam is defined as physical contact between the second end of the lockout cam and the seat in the second non-use state. The actuation cam engages with a stationary structure below the vehicle seating assembly. A position of the vehicle seating assembly relative to the stationary structure dictates a position of the actuation cam. The actuation cam disengages with a top surface of the stationary structure when the vehicle seating assembly is in at least one of the first non-use state and the second non-use state. Engagement between the actuation cam and the top surface of the stationary structure places the actuation cam in a position that provides a force to the cable that counteracts the biasing of the lockout cam to the engaged position. The cable extends between the actuation cam and the lockout cam such that the position of the actuation cam influences whether the lockout cam is in the engaged position or a disengaged position.

Embodiments of the second aspect of the present disclosure can include any one or a combination of the following features:
- the stationary structure is at least a portion of a track assembly to which the vehicle seating assembly is mounted;
- disengagement of the actuation cam with the top surface of the stationary structure causes a slackening of the cable that extends between the actuation cam and the lockout cam, and wherein such slackening of the cable allows the biasing of the lockout cam to place the lockout cam in the engaged position;
- the first non-use state results in actuation of a track release button and an interlock release button of a track assembly to which the vehicle seating assembly is mounted;
- the second non-use state results in actuation of the interlock release button; and the first non-use state places the seatback in a position that prevents occupancy of the vehicle seating assembly, whereas the second non-use state places the seat in a position that prevents occupancy of the vehicle seating assembly.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
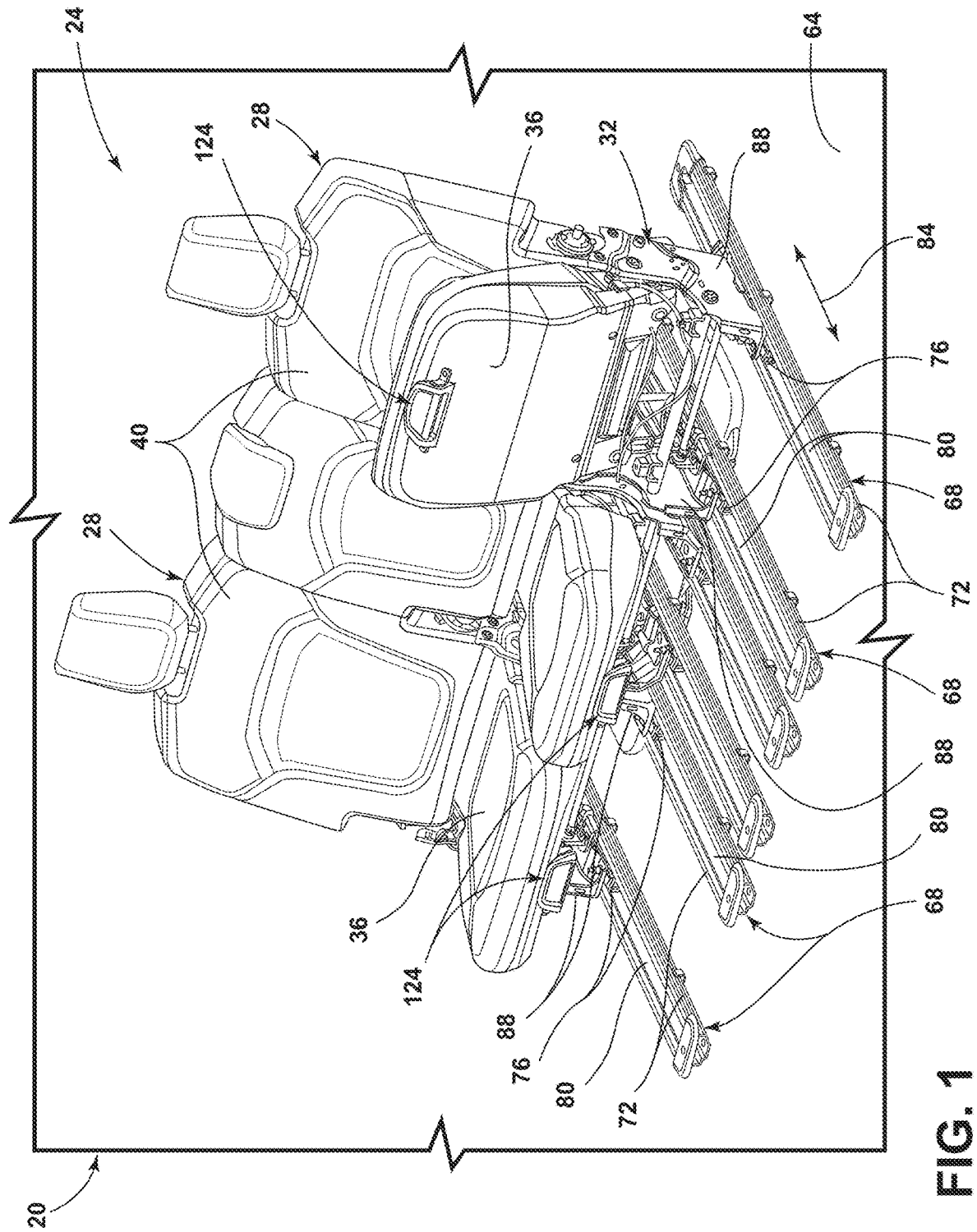
FIG. 1 is a front perspective view of a passenger compartment of a vehicle, illustrating vehicle seating assemblies positioned therein, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-15B, reference numeral 20 generally designates a vehicle 20. The vehicle 20 includes a passenger compartment 24 that is provided with one or more vehicle seating assemblies 28. The vehicle seating assembly 28 includes a mounting bracket 32, a seat 36, a seatback 40, and a cam assembly 44. The seat 36 is rotatably coupled to the mounting bracket 32. The seatback 40 is rotatably coupled to the mounting bracket 32. The seatback 40 includes a protrusion 48. The cam assembly 44 is rotatably coupled to the mounting bracket 32. The cam assembly 44 includes a lockout cam 52 having a first end 56 and a second end 60. The first end 56 of the lockout cam 52 engages with the protrusion 48 of the seatback 40 such that movement of the seatback 40 relative to the mounting bracket 32 is restricted in a first non-use state (e.g., see FIG. 13). The second end 60 of the lockout cam 52 engages with the seat 36 such that movement of the seat 36 relative to the mounting bracket 32 is restricted in a second non-use state (e.g., see FIG. 10).

Referring again to FIGS. 1-2C, the vehicle seating assembly 28 is coupled to a floor 64 of the passenger compartment 24. For example, one or more track assemblies 68 may couple the vehicle seating assembly 28 to the floor 64 of the passenger compartment 24. In such examples, the track assembly 68 can include a lower track 72 that is directly coupled to the floor 64 and an upper track 76 that is indirectly coupled to the floor 64. The upper track 76 is received within a slot 80 defined by the lower track 72. The upper track 76 is capable of moving along the lower track 72 such that a longitudinal position of the vehicle seating assembly 28 within the passenger compartment 24 may be adjusted, as indicated by arrow 84. The upper track 76 may alternatively be referred to as a carriage assembly. The vehicle seating assembly 28 is coupled to the upper track 76. For example, anchors 88 may extend from the vehicle seating assembly 28 for coupling to the upper track 76. More specifically, one of the anchors 88 may extend from the mounting bracket 32 on each side of the vehicle seating assembly 28 to engage with a corresponding one of the upper tracks 76. Therefore, movement of the upper track 76 and the vehicle seating assembly 28 may be coupled such that movement of one of the upper track 76 or the vehicle seating assembly 28 in the longitudinal direction along the lower track 72 results in corresponding movement of the other of the upper track 76 or the vehicle seating assembly 28.

Figure 2:
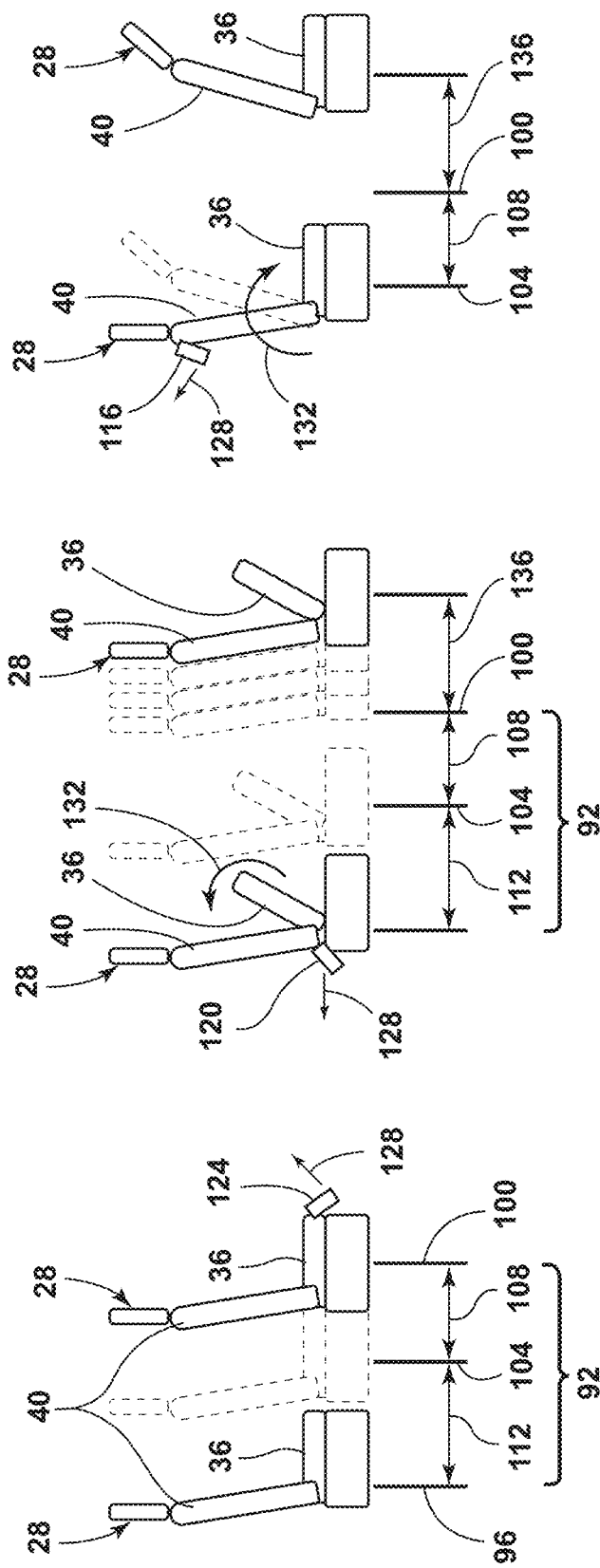
FIG. 2A is a schematic representation of movement of the vehicle seating assembly within an occupancy region of the passenger compartment, according to one example.
FIG. 2B is a schematic representation of movement of the vehicle seating assembly outside of the occupancy region of the passenger compartment, according to one example.
FIG. 2C is a schematic representation of movement of the vehicle seating assembly outside of the occupancy region of the passenger compartment, according to another example.

Referring further to FIGS. 1-2C, the vehicle seating assembly 28 of the present disclosure is configured to provide an end user with a substantial degree of adjustability. More specifically, as depicted in FIG. 2A, the vehicle seating assembly 28 is capable of adjusting the longitudinal position along the lower track 72 within an occupancy region 92 to enable the user to adjust a positioning of the vehicle seating assembly 28 within the passenger compartment 24 according to their specific comfort preferences. Additionally, the vehicle seating assembly 28 is capable of adjusting the longitudinal position along the lower track 72 beyond the occupancy region 92. For example, the vehicle seating assembly 28 is capable of assuming a storage configuration, as depicted in FIG. 2B, where the seat 36 is rotated upward toward the seatback 40 to make available a greater surface area of the floor 64 of the passenger compartment 24. Further, the vehicle seating assembly 28 is capable of assuming an easy-entry configuration by adjusting the longitudinal position along the lower track 72 and rotating the seatback 40 toward the seat 36, as shown in FIG. 2C.

With specific reference to FIGS. 2A-2C, the vehicle seating assembly 28 is intended to be occupied when in a use state, as depicted in FIG. 2A. In the use state, the vehicle seating assembly 28 is arranged to receive an occupant on the seat 36 thereof. The use state is not a single position of the vehicle seating assembly 28, but rather a range of positions that fall within an occupy-able subset of possible positions of the vehicle seating assembly 28. For example, the longitudinal position of the vehicle seating assembly 28 relative to the lower track 72 and/or the angular relationship between the seatback 40 and the seat 36 may be adjusted according to the user's comfort preferences while remaining in the use state. A design position of the vehicle seating assembly 28 may be a specific longitudinal position of the vehicle seating assembly 28 relative to the lower track 72 and/or a specific angular relationship between the seatback 40 and the seat 36. For example, the specific longitudinal position of the vehicle seating assembly 28 relative to the lower track 72 and the specific angular relationship between the seatback 40 and the seat 36 may represent a preferred arrangement of the vehicle seating assembly 28 for a majority of consumers, based on market research, population data, or other information. The vehicle seating assembly 28 is movable along the lower track 72 between a full rearward use position (line 96) and a full forward use position (line 100). A design longitudinal position (line 104) is positioned at an intermediate location between the full rearward use position and the full forward use position. In various examples, the design longitudinal position may be positioned closer to the full forward use position than the full rearward use position (i.e., not a center point therebetween). The design longitudinal position of the vehicle seating assembly 28 and a design angular relationship between the seat 36 and the seatback 40 is depicted in phantom in FIG. 2A.

Referring again to FIGS. 2A-2C, a distance 108 between the design longitudinal position and the full forward use position may be about 5.0 centimeters, about 10.0 centimeters, about 15.0 centimeters, about 20.0 centimeters, about 25.0 centimeters, and/or combinations or ranges thereof. Similarly, a distance 112 between the design longitudinal position and the full rearward use position may be about 5.0 centimeters, about 10.0 centimeters, about 15.0 centimeters, about 20.0 centimeters, about 25.0 centimeters, and/or combinations or ranges thereof. A length of the occupancy region 92 (e.g., from line 96 to line 100) may be about 10.0 centimeters, about 20.0 centimeters, about 30.0 centimeters, about 40.0 centimeters, about 50.0 centimeters, and/or combinations or ranges thereof. Actuation of the vehicle seating assembly 28 along the lower track 72 may be initiated by actuation of one or more handles. For example, a first handle 116 may be actuated to initiate moving the vehicle seating assembly 28 from the use state toward the first non-use state. A second handle 120 may be actuated to initiate moving the vehicle seating assembly 28 from the use state toward the second non-use state. A third handle 124 may be actuated to initiate moving the vehicle seating assembly 28 along the lower track 72.

Referring further to FIGS. 2A-2C, in some examples, the third handle 124 may be the only one of the handles that enables movement of the vehicle seating assembly 28 longitudinally along the lower track 72. Alternatively, actuation of the first handle 116 and/or the second handle 120 may simultaneously result in actuation of components of the vehicle seating assembly 28 that are associated with the third handle 124. Said another way, the first handle 116, the second handle 120, and the third handle 124 may each be capable of enabling actuation of the vehicle seating assembly 28 along the lower track 72. Accordingly, in such examples, the first handle 116 and the second handle 120 can each perform at least two functions when actuated. These at least two functions include moving the vehicle seating assembly 28 toward the first non-use state (actuation of the first handle 116) or the second non-use state (actuation of the second handle 120), as well as enabling actuation of the vehicle seating assembly 28 along the lower track 72. In contrast, the third handle 124 may be mono-functional in that actuation of the third handle 124 may only enable actuation of the vehicle seating assembly 28 along the lower track 72 (e.g., by disengaging the upper track 76 from the lower track 72). In various examples, the first handle 116 may be positioned within an upper region of a rear side of the seatback 40, the second handle 120 may be positioned within a lower region of the rear side of the seatback 40 or a rearward region of the seat 36, and the third handle 124 may be positioned in a forward region of the seat 36. However, the present disclosure is not limited to such positioning of the first handle 116, the second handle 120, and/or the third handle 124. An actuation force 128 is shown applied to each of the first, second, and third handles 116, 120, and 124. Movement arrows 132 are also shown in FIGS. 2B and 2C to denote one example of how application of the given actuation force 128 may induce movement of at least one component of the vehicle seating assembly 28.

Referring still further to FIGS. 2A-2C, the track assembly 68 may enable movement of the vehicle seating assembly 28 along the lower track 72 beyond the occupancy region 92 and into one or more non-occupancy regions 136. The non-occupancy region 136 may be positioned forward of the occupancy region 92, as depicted in FIGS. 2B and 2C, and/or rearward of the occupancy region 92. When the vehicle seating assembly 28 is positioned within the non-occupancy region 136, the cam assembly 44 can restrict movement of one or more components of the vehicle seating assembly 28 to prevent a user from occupying the vehicle seating assembly 28. For example, when the vehicle seating assembly 28 is positioned within the non-occupancy region 136, the cam assembly 44 may aid in retaining the vehicle seating assembly 28 in the first non-use state or the second non-use state. The movement of the vehicle seating assembly(ies) 28 discussed herein may apply to outboard vehicle seating assemblies, such as the left and right vehicle seating assemblies 28 depicted in FIG. 1. However, the movement attributed to the third handle 124 (actuation along the lower track 72) may also be applicable to vehicle seating assemblies that are in a central position (i.e., between the outboard vehicle seating assemblies).

Figure 3:
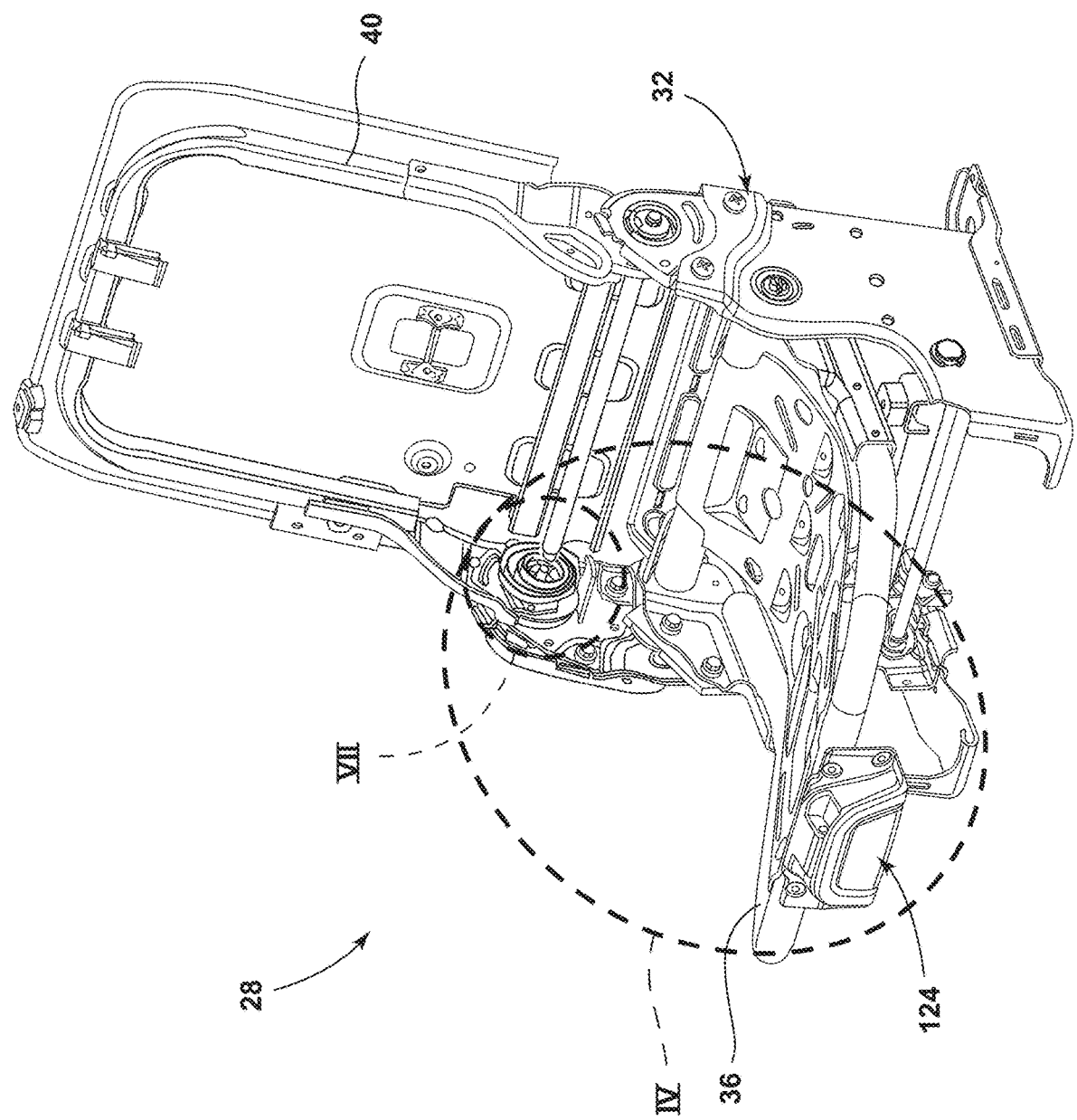
FIG. 3 is a front perspective view of the vehicle seating assembly, according to one example.
Figure 4:
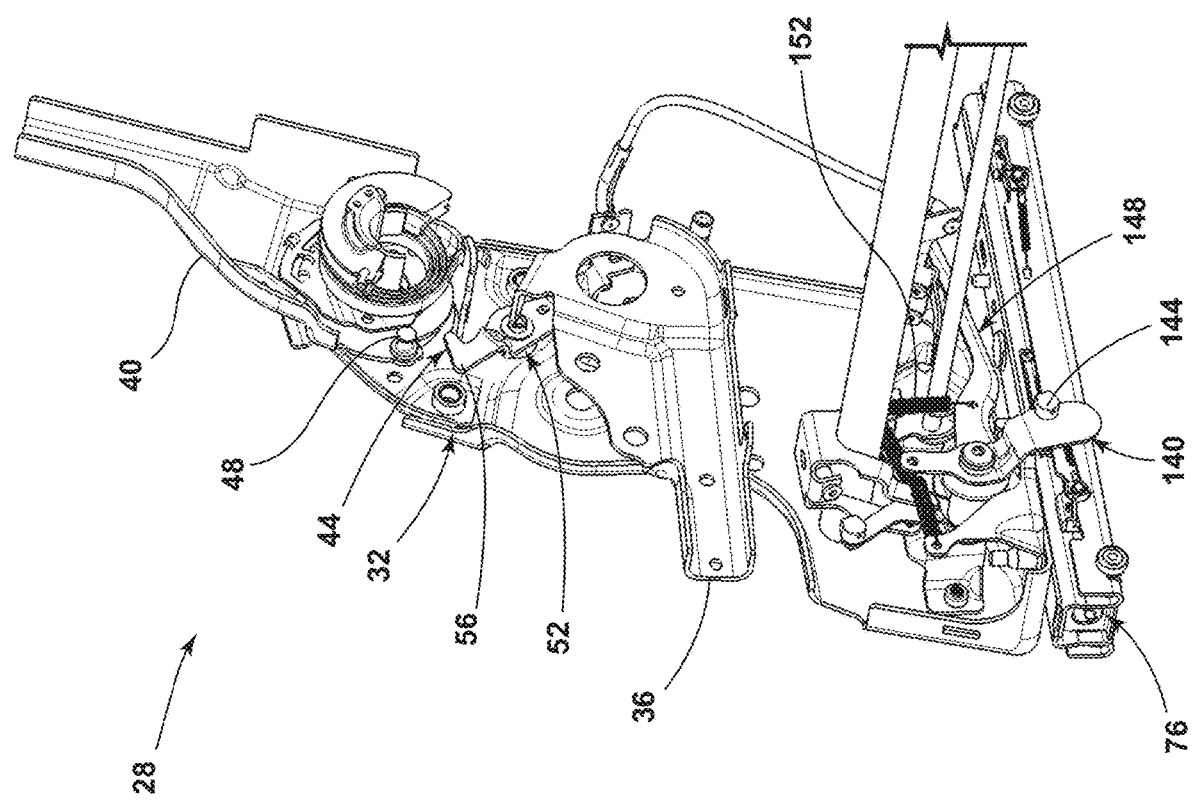
FIG. 4 is an expanded view of the vehicle seating assembly, from region IV of FIG. 3, according to one example.

Referring now to FIGS. 3 and 4, in some examples, the mounting bracket 32 may be integrally formed or unitarily formed with the anchor 88. In various examples, the seatback 40 may be coupled to the mounting bracket 32 and the seat 36 may be coupled to the anchor 88. In some examples, the anchor 88 may be a portion of the mounting bracket 32 that directly couples to the upper track 76. The vehicle seating assembly 28 is provided with an actuation cam 140. The actuation cam 140 is configured to engage with a stationary structure below the vehicle seating assembly 28. The stationary structure may be a portion of the floor 64 of the passenger compartment 24. Alternatively, the stationary structure may be at least a portion of the track assembly 68 to which the vehicle seating assembly 28 is coupled. For example, the stationary structure may be a portion of the lower track 72. A position of the vehicle seating assembly 28 relative to the stationary structure may dictate a position of the actuation cam 140, as will be discussed in further detail herein. The actuation cam 140 includes an attachment member 144 that is configured to couple with a cable (not shown). The cable that is coupled to the attachment member 144 is communicatively coupled to the lockout cam 52 such that the position of the actuation cam 140 influences whether the lockout cam 52 is in the engaged position or a disengaged position. The actuation cam 140 is directly coupled to an actuation arm 148 such that the actuation cam 140 and the actuation arm 148 move in a coordinated fashion. The actuation arm 148 is coupled to a biasing member 152 that provides a biasing force thereto. The biasing force provided to the actuation arm 148 by way of the biasing member 152 biases the actuation arm 148 to a raised position. The raised position of the actuation arm 148 corresponds with a down position of the actuation cam 140.

Figure 5:
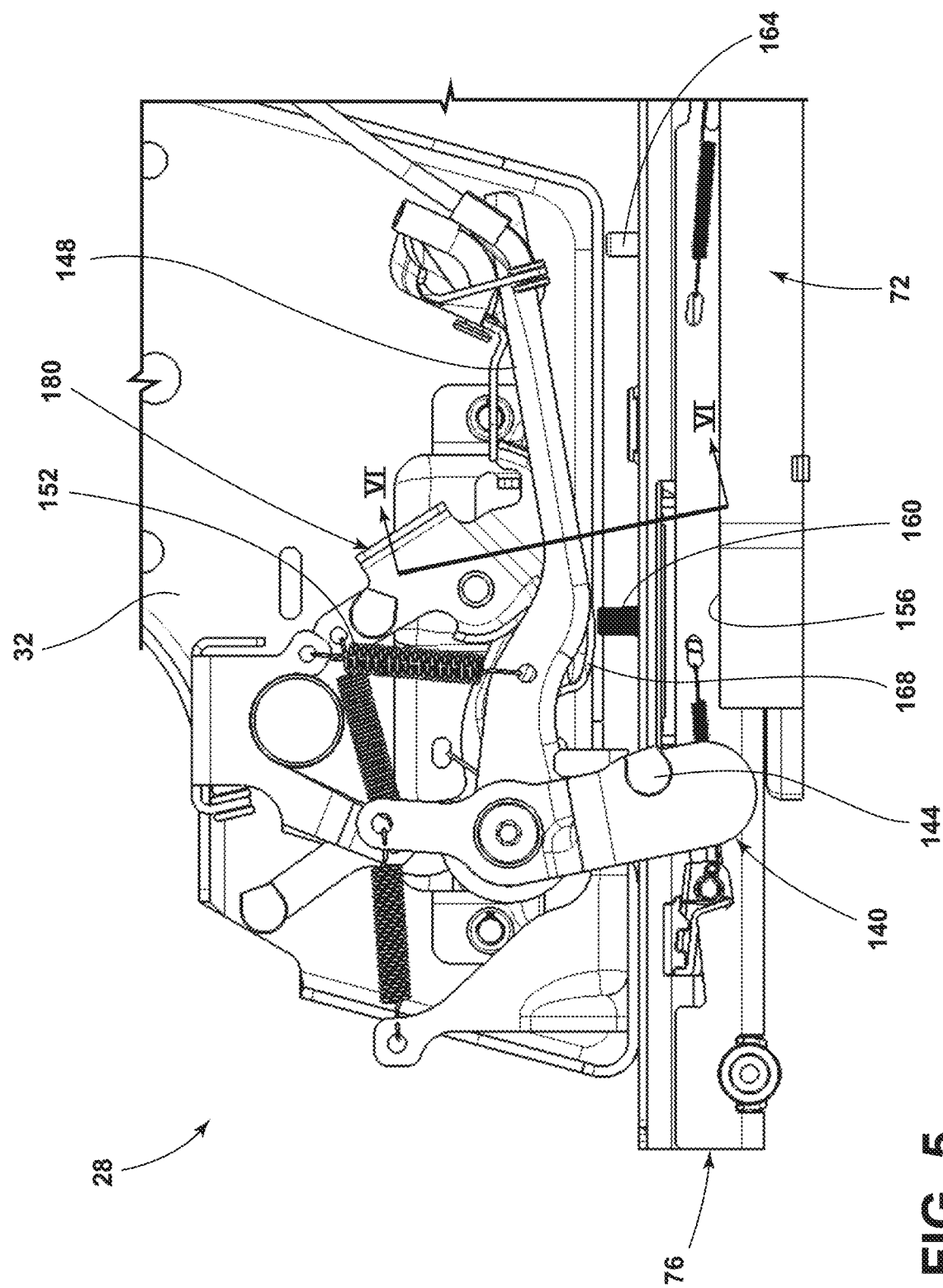
FIG. 5 is a side view of a lower portion of the vehicle seating assembly, illustrating interaction between components of the vehicle seating assembly and a track assembly, according to one example.
Figure 6:
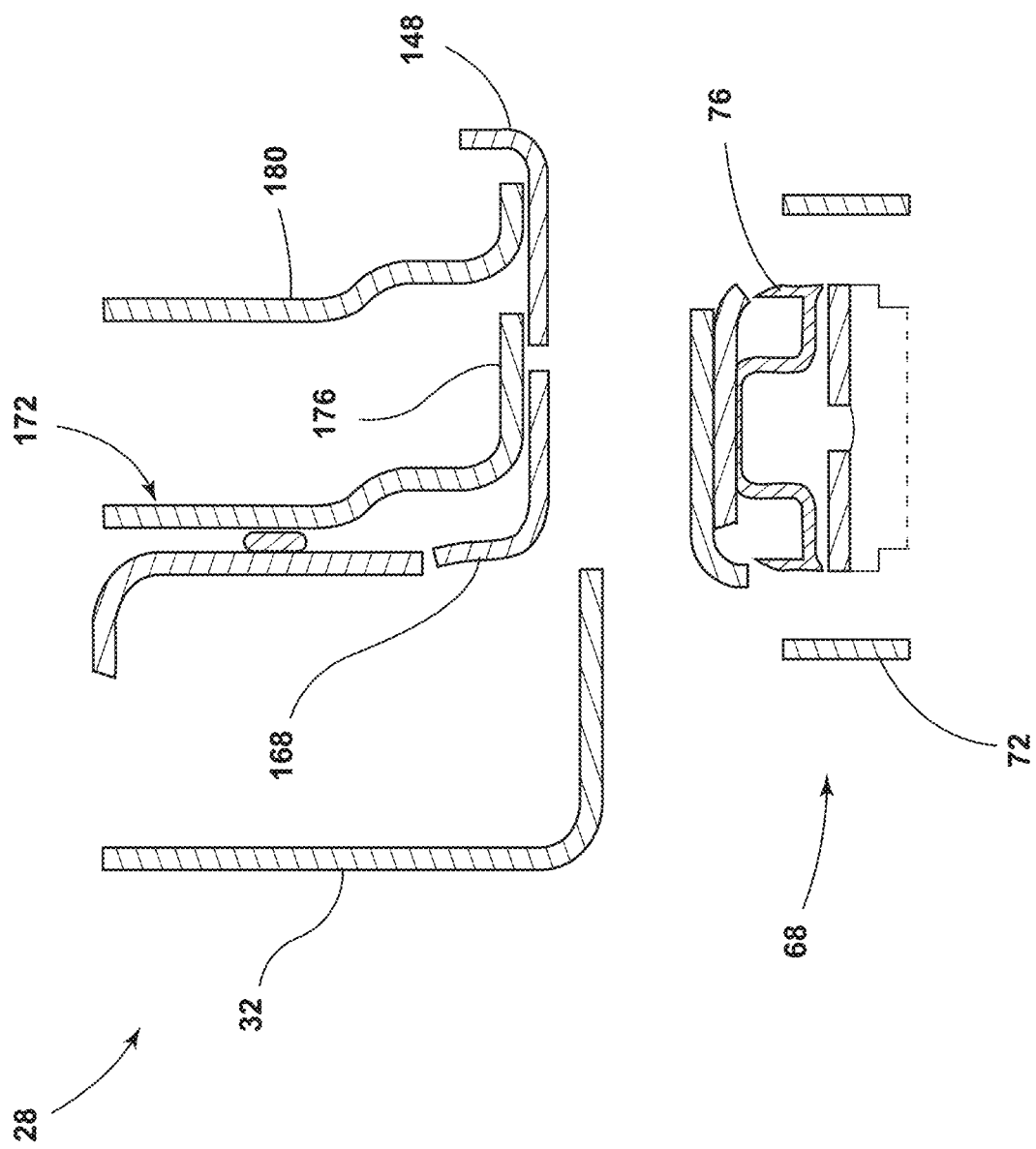
FIG. 6 is a cross-sectional view of the vehicle seating assembly and the track assembly, taken at line VI-VI of FIG. 5, illustrating interaction between components of the vehicle seating assembly, according to one example.

Referring to FIGS. 5 and 6, the actuation cam 140 is configured to disengage with a top surface 156 of the stationary structure (e.g., the floor 64 or the lower track 72) when the vehicle seating assembly 28 is in at least one of the first non-use state and the second non-use state. In some examples, the actuation cam 140 may fully disengage with the top surface 156 when the vehicle seating assembly 28 is in the first non-use state and/or the second non-use state such that no physical contact remains between the actuation cam 140 and any portion of the stationary structure (e.g., see FIG. 5). In alternative examples, the actuation cam 140 may maintain contact with a portion of the stationary structure that is not the top surface 156 when the vehicle seating assembly 28 is in the first non-use state and/or the second non-use state. In some examples, the actuation cam 140 may maintain contact with a top surface of a portion of the stationary structure that is located outside of the occupancy region 92 when the vehicle seating assembly 28 is in the first non-use state and/or the second non-use state.

Referring again to FIGS. 5 and 6, the track assembly 68 is provided with a track release button 160 and an interlock release button 164. Actuation of the track release button 160 can enable movement of the upper track 76, and ultimately the vehicle seating assembly 28, relative to the lower track 72 within the occupancy region 92. For example, actuation of the track release button 160 may be initiated by actuation of the third handle 124. The first non-use state results in actuation of the track release button 160 and the interlock release button 164 of the track assembly 68 to which the vehicle seating assembly 28 is configured to be mounted. More specifically, after initiating entrance into the first non-use state (e.g., by actuation of the first handle 116), the actuation arm 148 depresses the track release button 160 and an actuation lever 168 depresses the interlock release button 164. For example, upon initiation of entrance into the first non-use state, an easy entry release cam 172 may be rotated toward the upper track 76 such that the actuation arm 148 and the actuation lever 168 are each also rotated toward the upper track 76. The actuation arm 148 and the actuation lever 168 depress the interlock release button 164 and track release button 160, respectively, when rotated toward the upper track 76. The easy entry release cam 172 includes an engagement portion 176 that physically contacts the actuation arm 148 and the actuation lever 168 as the easy entry release cam 172 is rotated toward the upper track 76. The engagement portion 176 of the easy entry release cam 172 extends from the actuation lever 168 to the actuation arm 148 such that the engagement portion 176 may enable simultaneous movement of the actuation arm 148 and the actuation lever 168.

Referring further to FIGS. 5 and 6, the second non-use state results in actuation of the interlock release button 164. For example, the interlock release button 164 may be actuated in the second non-use state while the track release button 160 is not actuated in the second non-use state. Actuation of the track release button 160 independently from the interlock release button 164 is accomplished by rotation of the actuation lever 168 toward the upper track 76 in a manner that will be described further herein. The interlock release cam 180 may be sized and/or positioned such that the interlock release cam 180 is incapable of inducing actuation of the actuation lever 168. Initiating entrance into the second non-use state may be accomplished by actuation of the second handle 120.

Figure 7:
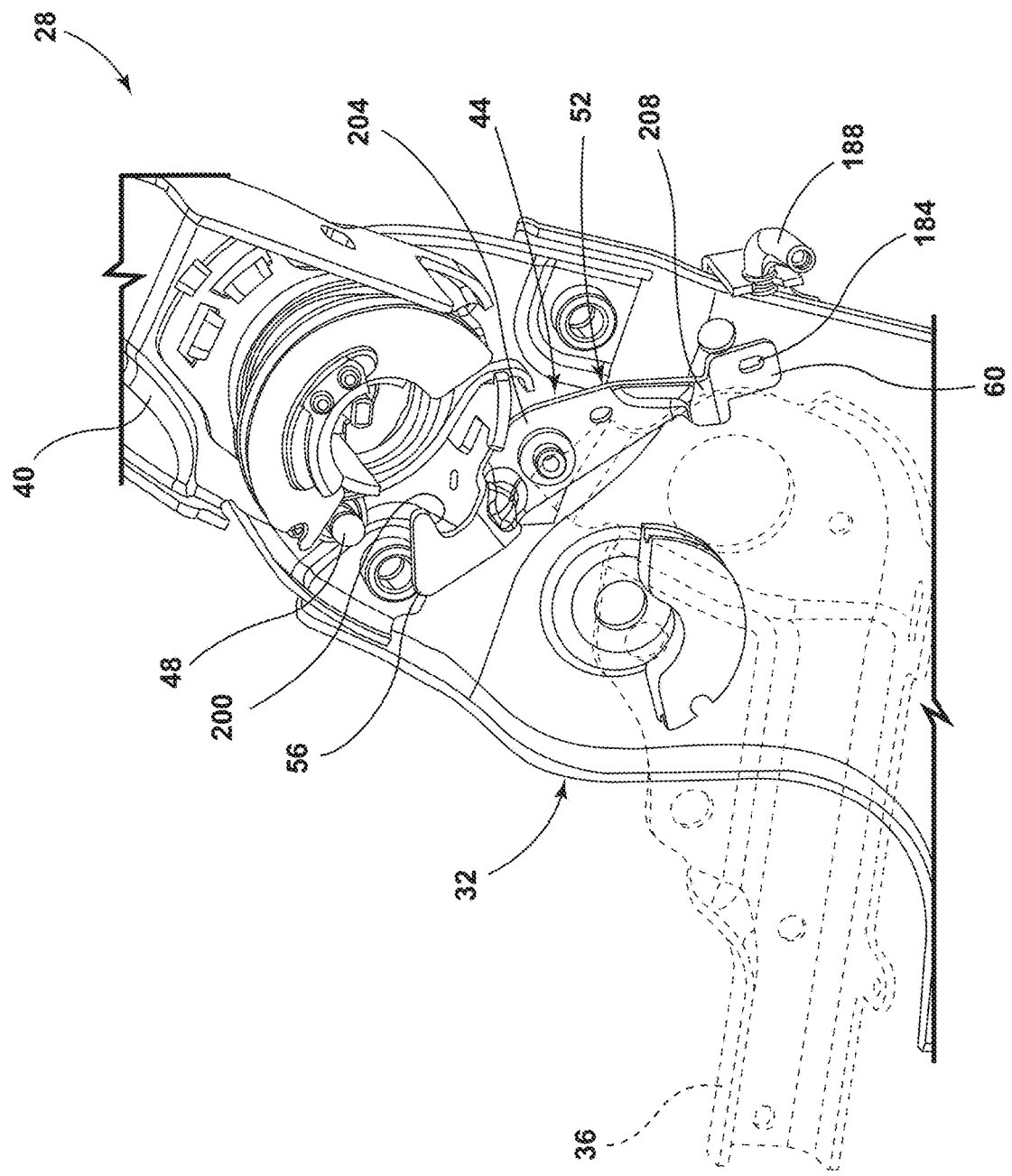
FIG. 7 is an expanded rear perspective view of region VII of FIG. 3, illustrating a lockout cam of the vehicle seating assembly, according to one example.
Figure 8A:
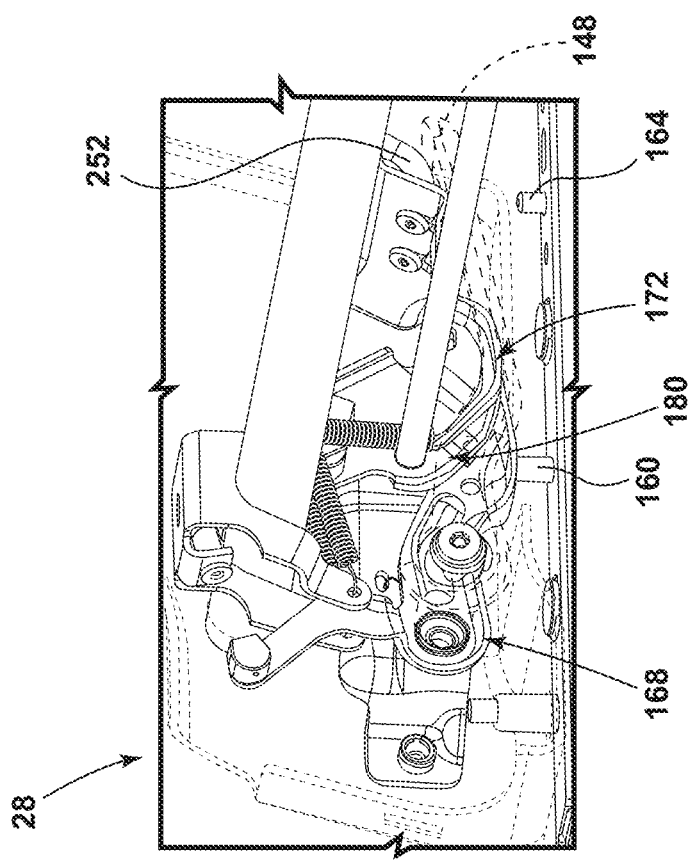
FIG. 8A is rear perspective view of the lower region of the vehicle seating assembly, illustrating an easy entry release cam and an interlock release cam, according to one example.
Figure 8B:
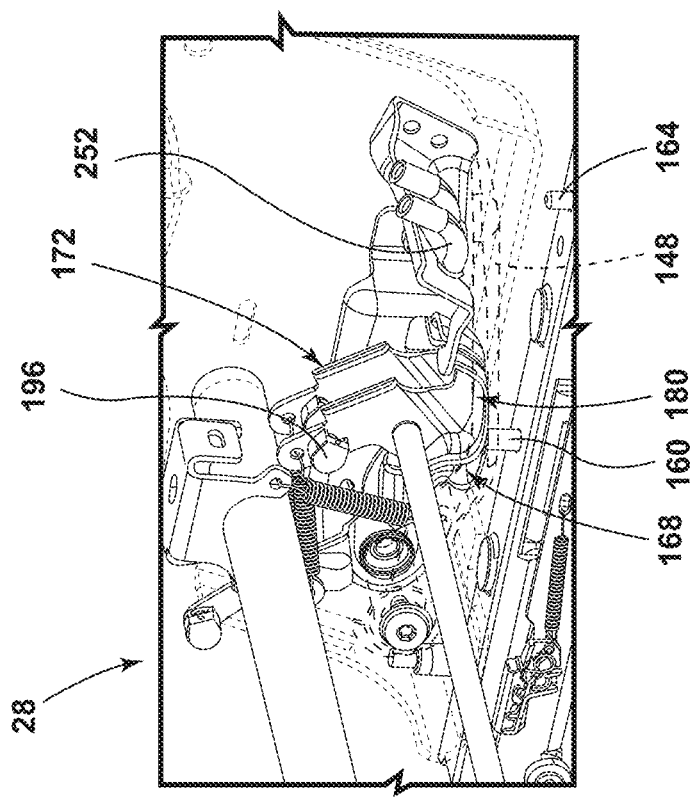
FIG. 8B is a front perspective view of the lower region of the vehicle seating assembly, illustrating an actuation arm and an actuation lever, according to one example.

Referring now to FIGS. 7-8B, the vehicle seating assembly 28 is shown in the design position, according to one example. The seat 36 and the actuation arm 148 are shown in phantom to reveal neighboring components for discussion. In the depicted design position, the upper track 76 is retained in the given position relative to the lower track 72 by the track release button 160 and the interlock release button 164. Additionally, the actuation arm 148, the actuation lever 168, the easy entry release cam 172, and the interlock release cam 180 are each in raised positions. When the actuation arm 148, the actuation lever 168, the easy entry release cam 172, and the interlock release cam 180 are each in raised positions, no direct physical contact may be present with each of these components and the upper track 76. In the design position, the lockout cam 52 is free of direct physical contact with the protrusion 48 of the seatback 40 and free of direct physical contact with the seat 36. The second end 60 of the lockout cam 52 defines a cable aperture 184 therein. The cable (not shown) that is configured to couple with the cable aperture 184 passes through a first conduit 188 that is positioned proximate to the lockout cam 52 and extends to couple with the attachment member 144 (see FIG. 5) of the actuation cam 140. Accordingly, movement of the actuation cam 140, which is induced based upon a positioning of the vehicle seating assembly 28 relative to the occupancy region 92, is translated to the lockout cam 52 by way of the cable extending therebetween. As depicted in FIG. 7, the lockout cam 52 is biased in the clockwise direction (e.g., with a clock spring). Therefore, when the actuation cam 140 is in the position depicted in FIG. 15A, a pulling force may be provided to the cable such that clockwise bias provided to the lockout cam 52 may be counter acted.

Referring again to FIGS. 7-8B, the first end 56 of the lockout cam 52 defines a recess 200 therein such that the first end 56 is generally hook-shaped. The recess 200 of the first end 56 is configured to receive the protrusion 48. A central region 204 of the lockout cam 52 receives a fastener that couples the lockout cam 52 to the mounting bracket 32. A biasing member, such as a clock spring, may be positioned at the central region 204 to provide the clockwise biasing force to the lockout cam 52. The central region 204 may be nearer to the mounting bracket 32 than the first end 56 and a portion of the second end 60. In other words, the lockout cam 52 may be contoured along a length thereof that extends between the first end 56 and the second end 60 such that a distance between adjacent surfaces of the mounting bracket 32 and the lockout cam 52 is not constant along the length of the lockout cam 52. The portion of the second end 60 that is spaced further from the mounting bracket 32 than the central region 204 may be referred to as a shelf 208. The portions of the lockout cam 52 that are configured to engage with, and retain positioning of, other components of the vehicle seating assembly 28 (e.g., the first end 56 and the shelf 208) can be positioned further from the mounting bracket 32 than the central region 204.

Figure 9B:
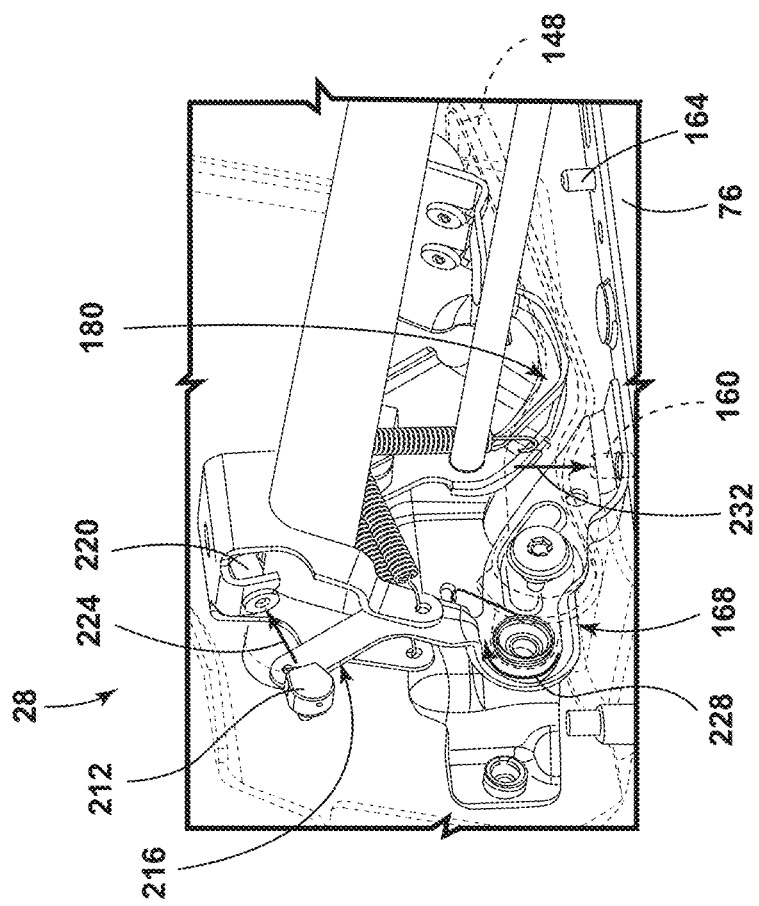
FIG. 9B is a front perspective view of the lower region of the vehicle seating assembly, illustrating actuation of the track release button by the actuation lever, according to one example.
Figure 9A:
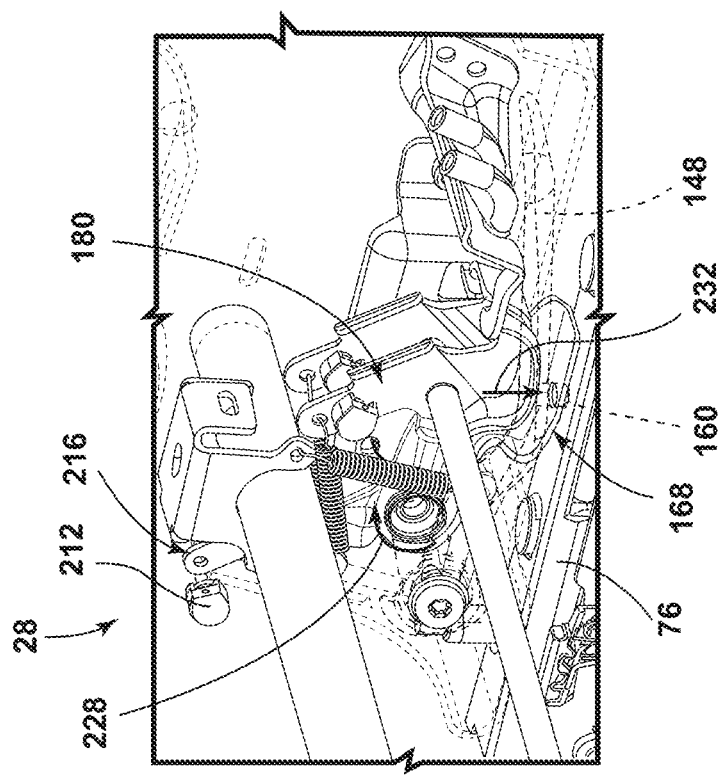
FIG. 9A is a rear perspective view of the lower region of the vehicle seating assembly, illustrating actuation of a track release button by the actuation lever, according to one example.

Referring to FIGS. 9A and 9B, a cable (not shown) extends from the third handle 124 to a coupling member 212 of a leg 216 of the actuation lever 168. Actuation of the third handle 124 results in a pulling force being applied to the cable that extends between the third handle 124 and the coupling member 212. The pulling force applied to the cable that extends between the third handle 124 and the coupling member 212 results in movement of the leg 216 toward a conduit 220 that the cable passes through, as indicated by arrow 224. The pulling force applied to the leg 216 results in rotation of the actuation lever 168, as indicated by arrow 228. Rotation of the actuation lever 168 toward the upper track 76 results in actuation of the track release button 160 to a lowered, or depressed, position, as indicated by arrow 232. Such actuation of the track release button 160 enables the upper track 76, and ultimately the vehicle seating assembly 28, to be adjusted in its position along the lower track 72 within the occupancy region 92. Actuation of the third handle 124 can initiate the actuation lever 168 to disengage the track release button 160 without movement of the easy entry release cam 172. The progression of the components as described in FIGS. 9A and 9B may be referred to as an occupant comfort adjust functionality.

Figure 10:
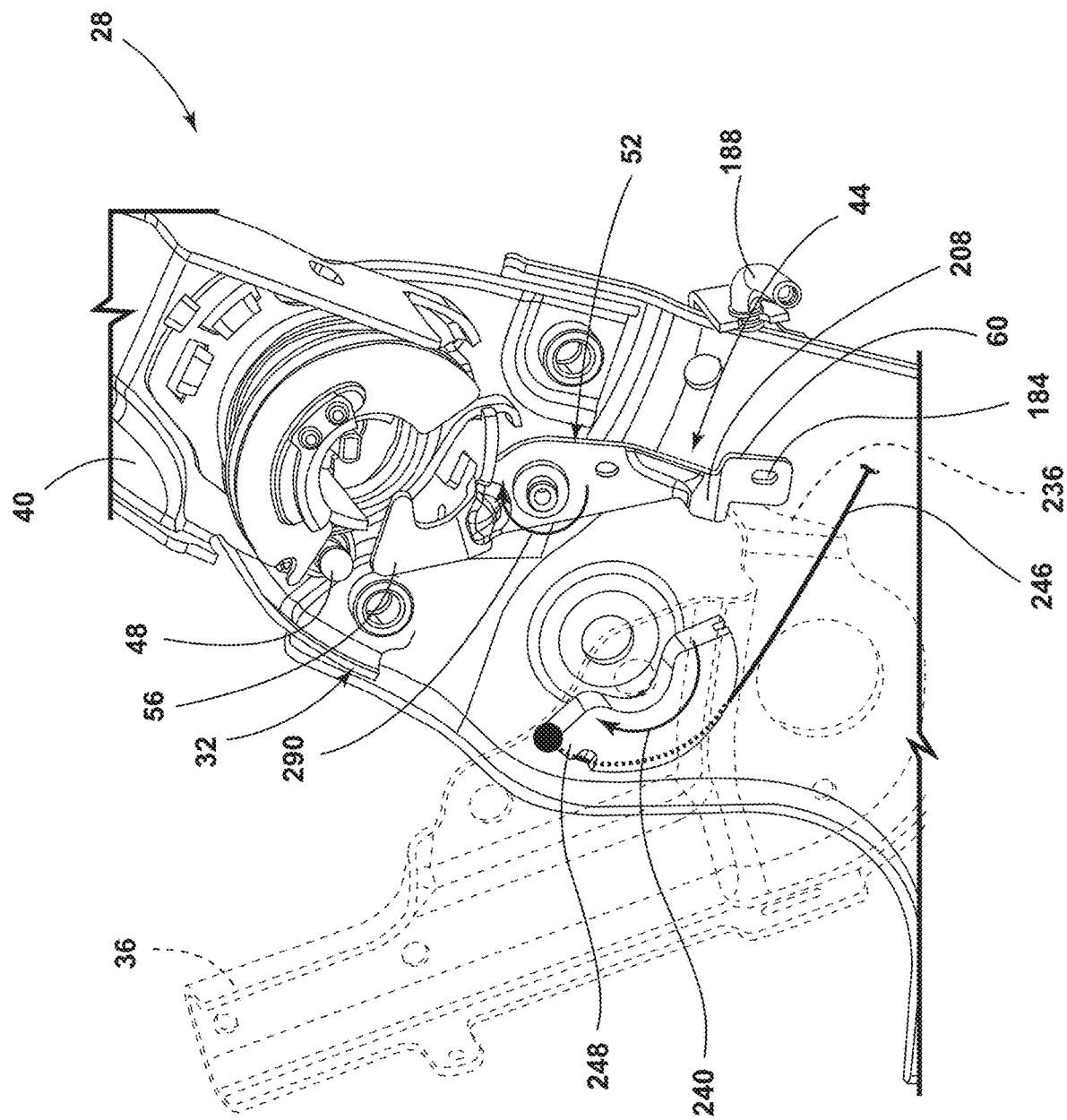
FIG. 10 is a rear perspective view of the vehicle seating assembly, illustrating a seat of the vehicle seating assembly in a raised position and the lockout cam in an engaged position with the seat, according to one example.
Figure 11A:
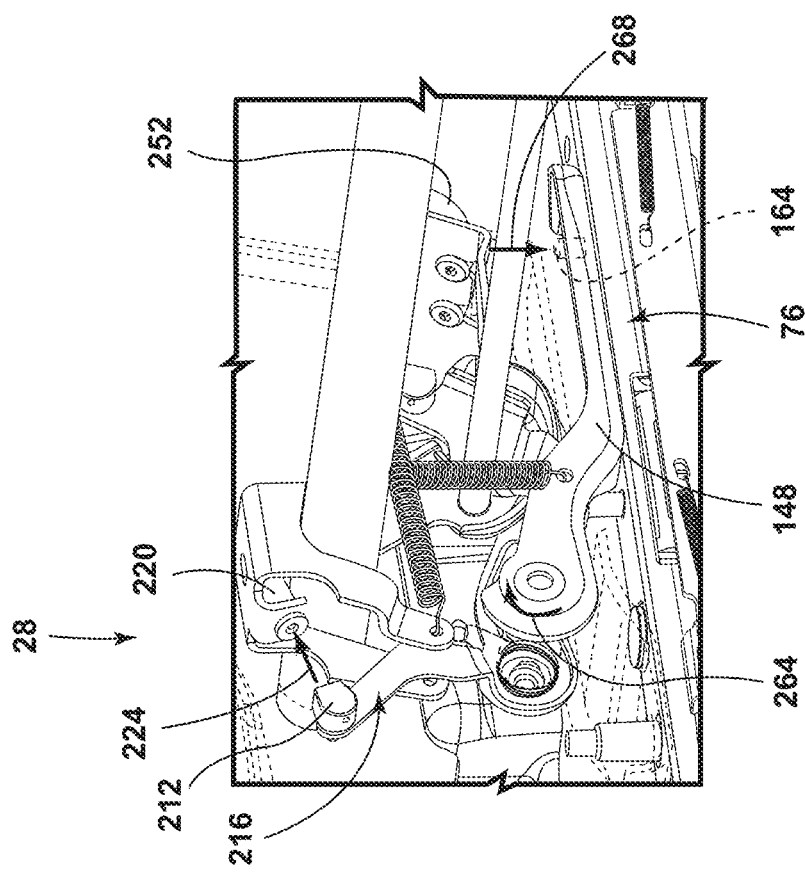
FIG. 11A is a rear perspective view of the lower region of the vehicle seating assembly, illustrating actuation of an interlock release button by the actuation arm, according to one example.
Figure 11B:
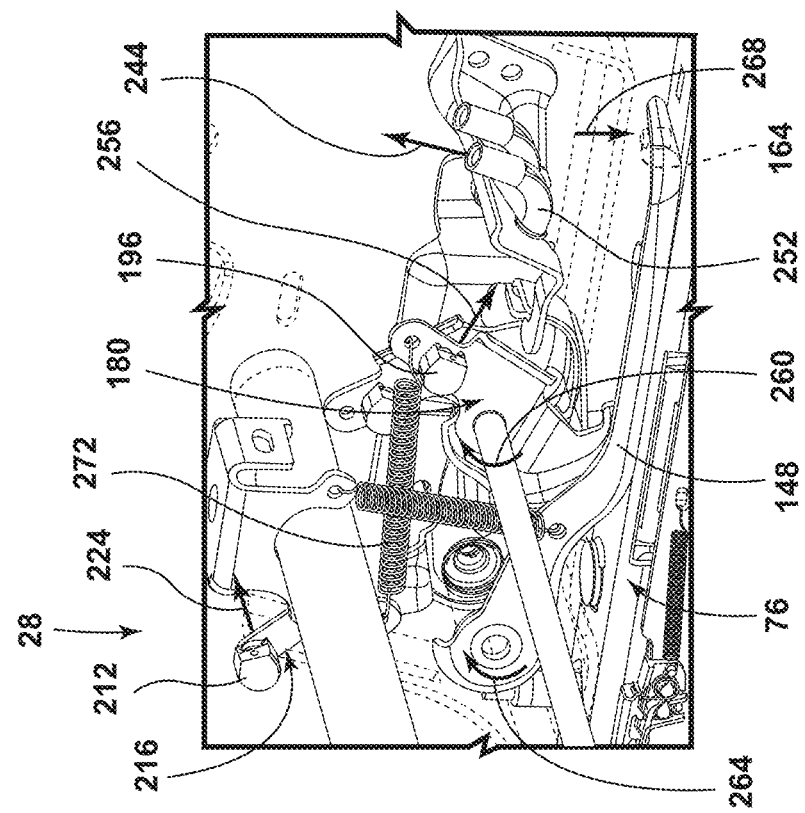
FIG. 11B is a front perspective view of the lower region of the vehicle seating assembly, illustrating actuation of the interlock release button by the actuation arm, according to one example.
Figure 12:
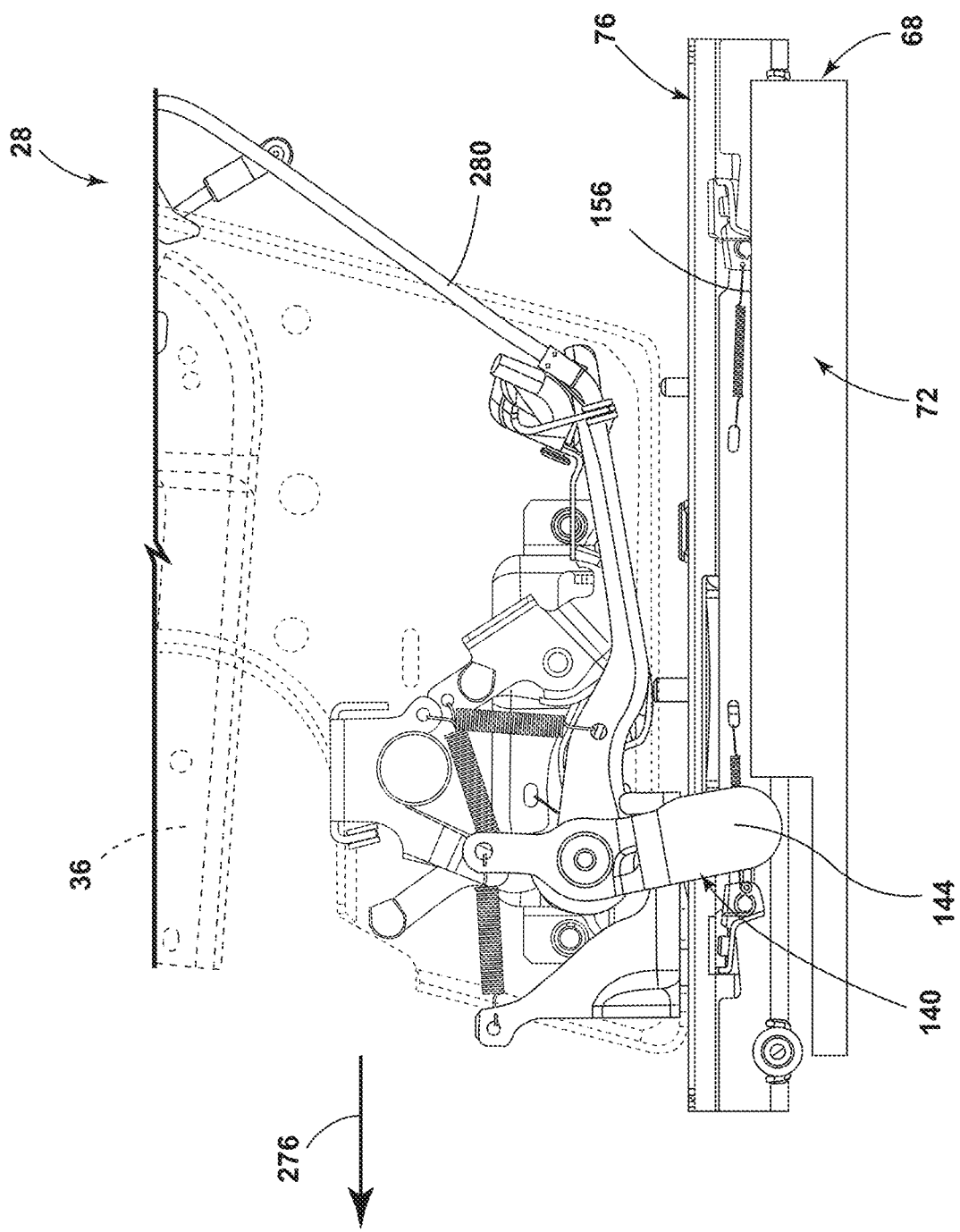
FIG. 12 is a side view of the lower region of the vehicle seating assembly, illustrating an actuation cam in a disengaged position relative to a stationary structure that is positioned below the vehicle seating assembly, according to one example.
Figure 13:
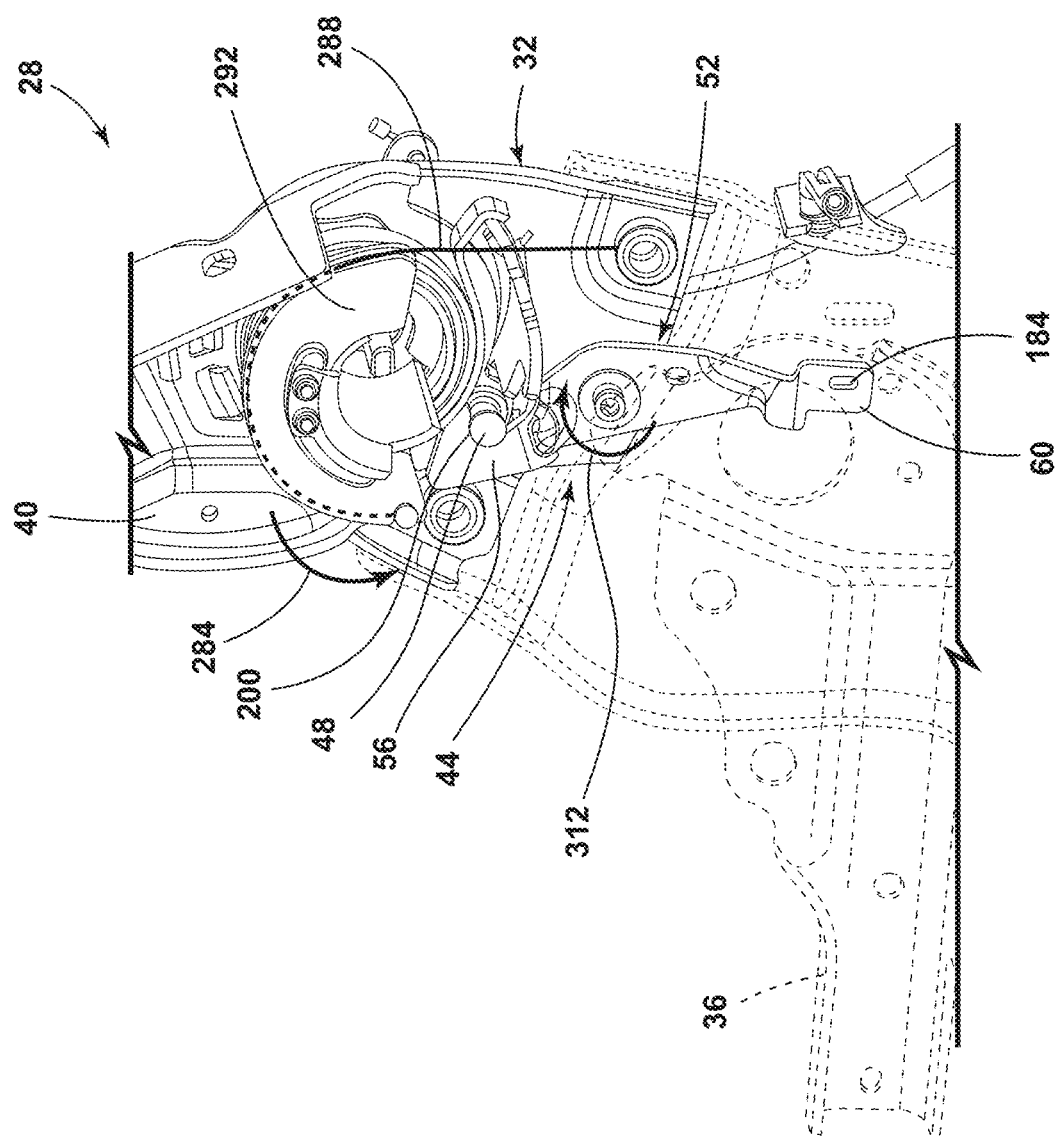
FIG. 13 is a rear perspective view of the vehicle seating assembly, illustrating a seatback of the vehicle seating assembly in a forwardly-rotated position and the lockout cam in an engaged position with the seatback, according to one example.
Figure 14B:
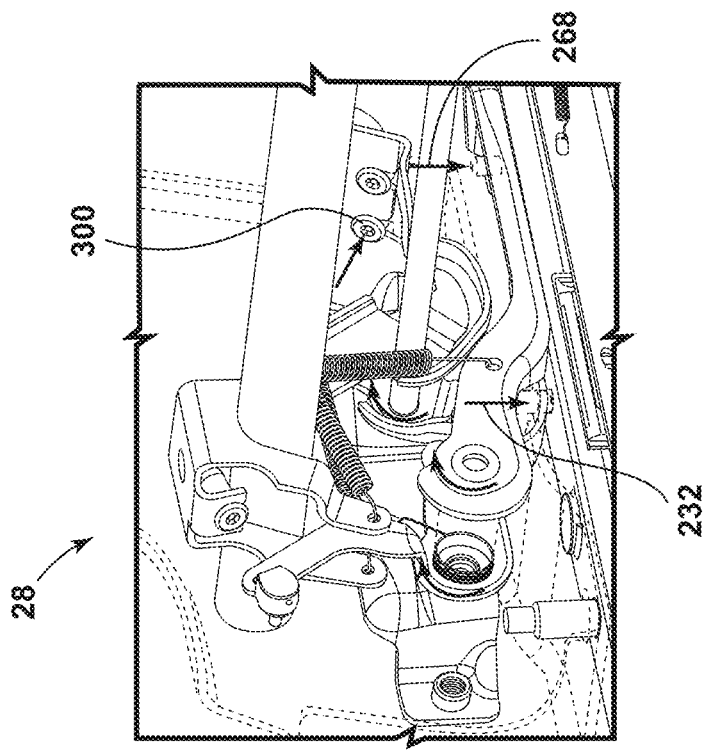
FIG. 14B is a front perspective view of the lower region of the vehicle seating assembly, illustrating actuation of the track release button and the interlock release button, according to one example.
Figure 14A:
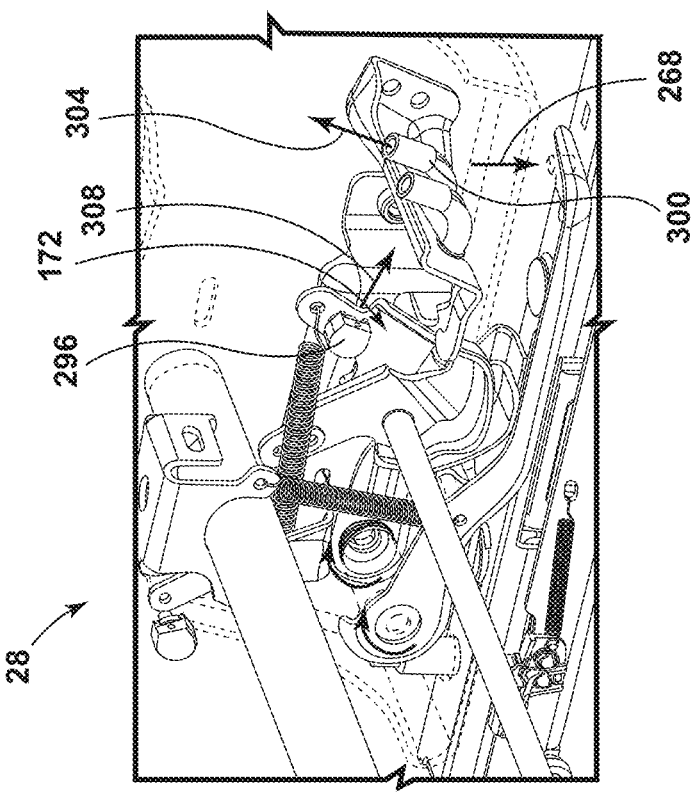
FIG. 14A is a rear perspective view of the lower region of the vehicle seating assembly, illustrating actuation of the track release button and the interlock release button, according to one example.

Referring now to FIGS. 10-12, with preceding figures, the seat 36 and the actuation arm 148 are shown in phantom to enable depiction of adjacent structures and components. The second non-use state is depicted. In the second non-use state, the engaged position of the lockout cam 52 is defined as physical contact between the second end 60 of the lockout cam 52 and the seat 36. For example, the shelf 208 of the second end 60 of the lockout cam 52 can directly engage with a rear portion 236 of the seat 36. In such an example, the direct physical contact between the shelf 208 and the rear portion 236 may represent the engaged position of the lockout cam 52 for the second non-use state. The engagement between the lockout cam 52 and the seat 36 retains the seat 36 in a position that prevents occupancy of the vehicle seating assembly 28 for the second non-use state. The second non-use state may be referred to as a seat-up cargo stow state. The seat 36 may be biased toward the position depicted in FIG. 10 such that actuation of the second handle 120 releases one or more components of the vehicle seating assembly 28 and permits a biasing force to rotate the seat 36 toward the seatback 40. In the second non-use state, rotation of the seat 36 toward the seatback 40, as indicated by arrow 240, results in a pulling force, indicated at arrow 244, being applied to a cable 246 that extends from a seat spool 248 to a coupling member 196 of the interlock release cam 180. The cable 246 passes through a second conduit 252 that is positioned proximate to the interlock release cam 180.

Referring again to FIGS. 10-12, the pulling force applied to the cable 246 causes the coupling member 196 to move toward the second conduit 252, as indicated by arrow 256. The movement of the coupling member 196 toward the second conduit 252 induces rotation of the interlock release cam 180 toward the upper track 76, as indicated by arrow 260. The rotation of the interlock release cam 180 toward the upper track 76 that is indicated by arrow 260 results in physical contact between the interlock release cam 180 and the actuation arm 148. Accordingly, rotation of the interlock release cam 180 toward the upper track 76 induces rotation of the actuation arm 148 toward the upper track 76, as indicated by arrow 264. The rotation of the actuation arm 148 toward the upper track 76 results in actuation of the interlock release button 164 to the lowered, or disengaged, position, as indicated by arrow 268. Biasing members, such as coil springs 272, may be provided that are configured to bias the actuation arm 148 and the interlock release cam 180 to raised positions (e.g., see FIG. 5).

Referring further to FIGS. 10-12, as the vehicle seating assembly 28 is moved forward, as indicated by arrow 276, the actuation cam 140 disengages with the top surface 156 of the stationary structure. The actuation cam 140 may disengage with the top surface 156 of the stationary structure when the vehicle seating assembly 28 is moved outside of the occupancy region 92 and into the non-occupancy region 136. In various examples, the stationary structure may be the lower track 72 of the track assembly 68. Disengaging the actuation cam 140 with the top surface 156 of the stationary structure causes a slackening of the cable that extends between the actuation cam 140 and the lockout cam 52. Such slackening allows the biasing force applied to the lockout cam 52 to act upon the cable extending between the lockout cam 52 and the actuation cam 140 such that the lockout cam 52 may enter the engaged position. Accordingly, the actuation cam 140 is caused to rotate counter-clockwise and the lockout cam 52 rotates clockwise as the cable moves through the first conduit 188 and a third conduit 280. The clockwise rotation of the lockout cam 52, as indicated by arrow 290, results in the physical contact between the shelf 208 and the rear portion 236 such that the seat 36 is maintained in the second non-use state so long as the vehicle seating assembly 28 is in the non-occupancy region 136.

Referring to FIGS. 12-14B, the first non-use state is depicted. In the first non-use state, the engaged position of the lockout cam 52 is defined as physical contact between the first end 56 of the lockout cam 52 and the protrusion 48 of the seatback 40. More specifically, in the first non-use state, the protrusion 48 is received within the recess 200 defined by the first end 56 of the lockout cam 52. Actuation of the first handle 116 may permit the seatback 40 to rotate toward the seat 36, as indicated by arrow 284. In some examples, without the rotation of the seatback 40 toward the seat 36 indicated at arrow 284, the protrusion 48 may not be able to be received within the recess 200. The rotation of the seatback 40 toward the seat 36 can provide a pulling force to a cable 288 that extends between a seatback spool 292 and an attachment member 296 of the easy entry release cam 172. The cable 288 passes through a fourth conduit 300 that is positioned proximate to the easy entry release cam 172.

Referring again to FIGS. 12-14B, the pulling force applied to the cable 288 causes the cable 288 to move upwardly through the fourth conduit 300, as indicated by arrow 304. Such movement of the cable 288 causes the attachment member 296 of the easy entry release cam 172 to move toward the fourth conduit 300, as indicated by arrow 308. The movement of the attachment member 296 toward the fourth conduit 300 causes the easy entry release cam 172 to rotate toward the upper track 76. As the easy entry release cam 172 is rotated toward the upper track 76, the engagement portion 176 physically contacts the actuation arm 148 and the actuation lever 168 such that the actuation arm 148 and the actuation lever 168 are each also rotated toward the upper track 76. Rotation of the actuation arm 148 and the actuation lever 168 toward the upper track 76 results in actuation, or depression, of the track release button 160 and the interlock release button 164, as indicated by arrows 232 and 268. Actuation and disengagement of the track release button 160 and the interlock release button 164 can permit the upper track 76, and ultimately the vehicle seating assembly 28, to slide along the lower track 72 to the non-occupancy region 136. For example, actuation and disengagement of the track release button 160 and the interlock release button 164 can permit the upper track 76, and ultimately the vehicle seating assembly 28, to slide forward as indicated by the arrow 276 such that access may be granted to a row of vehicle seating assemblies that is positioned rearward of the vehicle seating assembly 28 (e.g., a second row or a third row).

Referring further to FIGS. 12-14B, in the first non-use state, the engaged position of the lockout cam 52 is defined as physical contact between the first end 56 of the lockout cam 52 and the protrusion 48 of the seatback 40. The first non-use state places the seatback 40 in a position that prevents a user from occupying the vehicle seating assembly 28. As with the process described above for the second non-use state, as the actuation cam 140 disengages with the top surface 156 of the stationary structure (e.g., a portion of the floor 64 or a portion of the lower track 72), the biasing force applied to the lockout cam 52 initiates rotation of the lockout cam 52 toward the engaged position. More specifically, in the depicted example, the biasing force of the lockout cam 52 is countered by the physical interference between the actuation cam 140 and the stationary structure (see FIG. 15A). Accordingly, once the physical interference between the actuation cam 140 and the stationary structure is no longer present, the biasing force applied to the lockout cam 52 rotates the recess 200 toward the protrusion 48, as indicated at arrow 312, and ultimately provides a pulling force to the cable that extends between the cable aperture 184 and the attachment member 144.

Figure 15A:
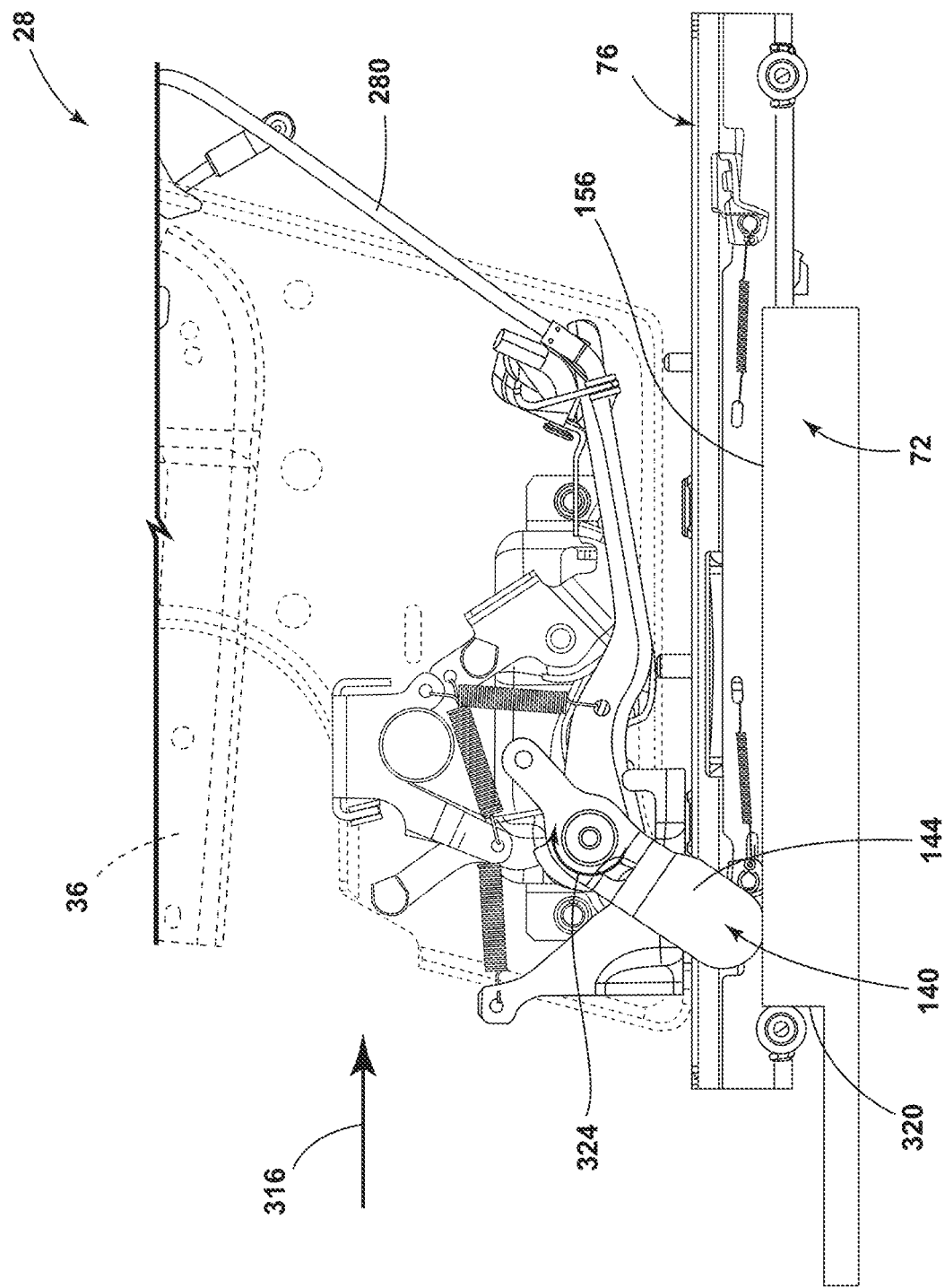
FIG. 15A is side view of the lower region of the vehicle seating assembly, illustrating the actuation cam in an engaged position with the stationary structure that is positioned below the vehicle seating assembly, according to one example.
Figure 15B:
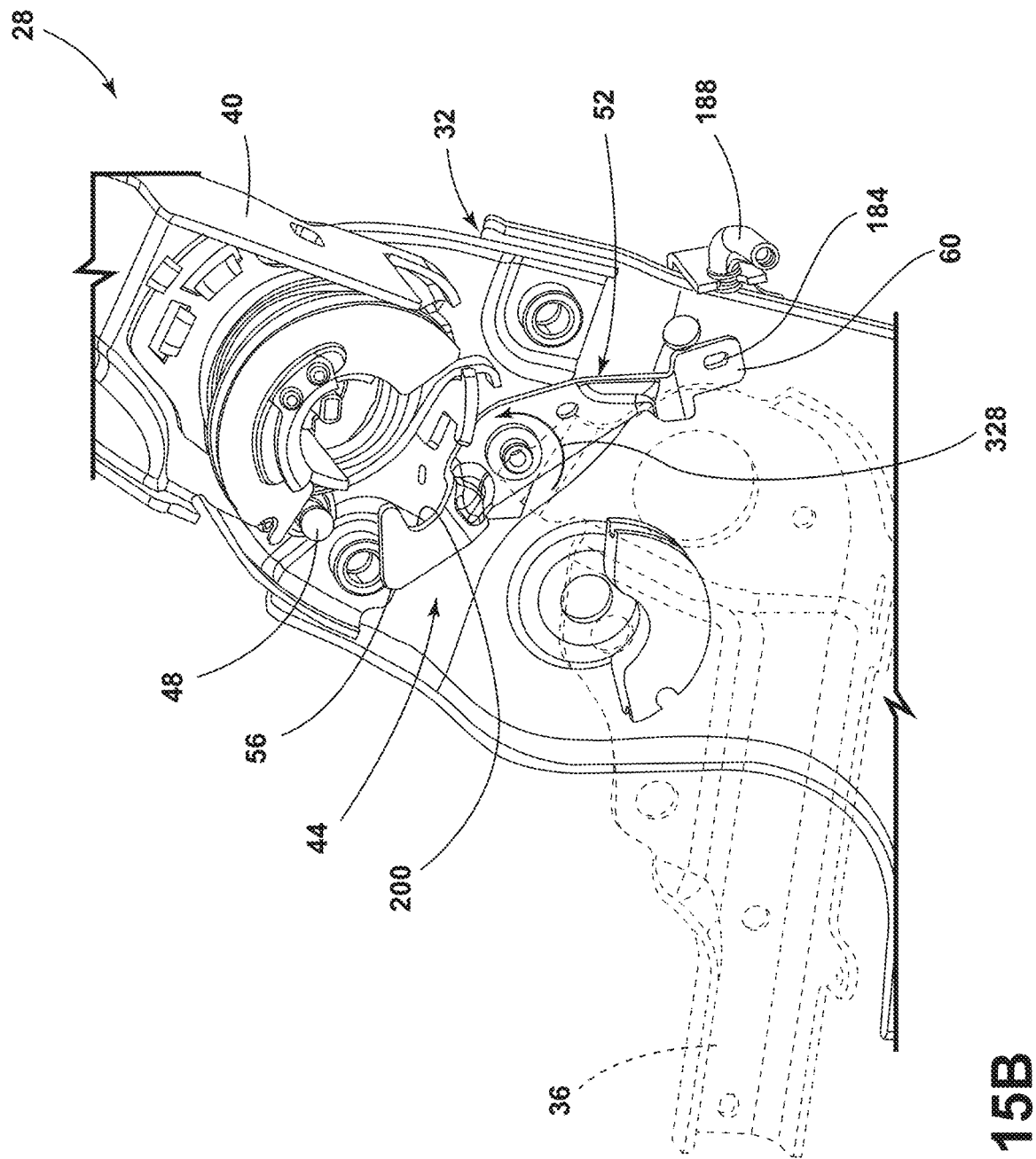
FIG. 15B is a rear perspective view of the vehicle seating assembly, illustrating the lockout cam in a disengaged position, according to one example.

Referring now to FIGS. 15A and 15B, when the lockout cam 52 is in the engaged position, whether for the first non-use state or the second non-use state, re-engagement between the actuation cam 140 and the stationary structure (e.g., the top surface 156 of the lower track 72) initiates transitioning the lockout cam 52 to the disengaged position depicted in FIG. 15B. Accordingly, as the vehicle seating assembly 28 and the upper track 76 are actuated rearwardly along the lower track 72, as indicated by arrow 316, the actuation cam 140 contacts a front surface 320 of a portion of the lower track 72. The contact between the front surface 320 and the actuation cam 140 results in clockwise rotation of the actuation cam 140, as indicated by arrow 324. Therefore, when the vehicle seating assembly 28 moves from the non-occupancy region 136 to the occupancy region 92, the actuation cam 140 is rotated clockwise and acts against the biasing force that encourages the lockout cam 52 to the engaged position.

Referring again to FIGS. 15A and 15B, engagement between the actuation cam 140 and the top surface 156 of the stationary structure (e.g., the lower track 72) places the actuation cam 140 in a position that provides a force (e.g., a constant force) to the cable that counter-acts the biasing of the lockout cam 52 to the engaged position. The clockwise rotation of the actuation cam 140 results in a pulling force being applied to the cable that extends between the attachment member 144 and the cable aperture 184. The pulling force applied to the cable as a result of the clockwise rotation of the actuation cam 140 results in the second end 60 of the lockout cam 52 being pulled toward the first conduit 188. Movement of the second end 60 of the lockout cam 52 toward the first conduit 188 causes a counter-clockwise rotation of the lockout cam 52, as indicated by arrow 328, which results in a disengagement between the recess 200 and the protrusion 48. With the lockout cam 52 exiting the engaged position, the vehicle seating assembly 28 is capable of returning to an arrangement of the seat 36 and the seatback 40 that is capable of receiving an occupant.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
   a mounting bracket;
   a seat that is rotatably coupled to the mounting bracket;
   a seatback that is rotatably coupled to the mounting bracket, wherein the seatback comprises a protrusion;
   a cam assembly rotatably coupled to the mounting bracket, wherein the cam assembly comprises a lockout cam having a first end and a second end, wherein the first end of the lockout cam engages with the protrusion of the seatback such that movement of the seatback relative to the mounting bracket is restricted in a first non-use state, and wherein the second end of the lockout cam engages with the seat such that movement of the seat relative to the mounting bracket is restricted in a second non-use state, wherein the lockout cam is biased toward an engaged position;
   an actuation cam that is configured to engage with a stationary structure below the vehicle seating assembly, wherein a position of the vehicle seating assembly relative to the stationary structure dictates a position of the actuation cam; and a cable that extends between the actuation cam and the lockout cam such that the position of the actuation cam influences whether the lockout cam is in the engaged position or a disengaged position, wherein disengagement of the actuation cam with a top surface of the stationary structure causes a slackening of the cable that extends between the actuation cam and the lockout cam, and wherein such slackening of the cable allows the biasing of the lockout cam to place the lockout cam in the engaged position.

2. The vehicle seating assembly of claim 1, wherein the engaged position of the lockout cam is defined as physical contact between the first end of the lockout cam and the protrusion of the seatback in the first non-use state.

3. The vehicle seating assembly of claim 1, wherein the engaged position of the lockout cam is defined as physical contact between the second end of the lockout cam and the seat in the second non-use state.

4. The vehicle seating assembly of claim 1, wherein the stationary structure is at least a portion of a track assembly to which the vehicle seating assembly is configured to be mounted.

5. The vehicle seating assembly of claim 1, wherein the actuation cam is configured to disengage with a top surface of the stationary structure when the vehicle seating assembly is in at least one of the first non-use state and the second non-use state.

6. The vehicle seating assembly of claim 1, wherein engagement between the actuation cam and the top surface of the stationary structure places the actuation cam in a position that provides a force to the cable that counter-acts the biasing of the lockout cam to the engaged position.

7. The vehicle seating assembly of claim 1, wherein the first non-use state results in actuation of a track release button and an interlock release button of a track assembly to which the vehicle seating assembly is configured to be mounted.

8. The vehicle seating assembly of claim 7, wherein the second non-use state results in actuation of the interlock release button.

9. The vehicle seating assembly of claim 1, wherein the first non-use state places the seatback in a position that prevents occupancy of the vehicle seating assembly.

10. The vehicle seating assembly of claim 7, wherein the second non-use state places the seat in a position that prevents occupancy of the vehicle seating assembly.

11. A vehicle seating assembly, comprising:
a mounting bracket;
a seat that is rotatably coupled to the mounting bracket;
a seatback that is rotatably coupled to the mounting bracket, wherein the seatback comprises a protrusion;
a cam assembly rotatably coupled to the mounting bracket, wherein the cam assembly comprises a lockout cam that is biased toward an engaged position, wherein the lockout cam comprises a first end and a second end, wherein the first end of the lockout cam engages with the protrusion of the seatback such that movement of the seatback relative to the mounting bracket is restricted in a first non-use state, wherein the engaged position of the lockout cam is defined as physical contact between the first end of the lockout cam and the protrusion of the seatback in the first non-use state, wherein the second end of the lockout cam engages with the seat such that movement of the seat relative to the mounting bracket is restricted in a second non-use state, and wherein the engaged position of the lockout cam is defined as physical contact between the second end of the lockout cam and the seat in the second non-use state;
an actuation cam that engages with a stationary structure below the vehicle seating assembly, wherein a position of the vehicle seating assembly relative to the stationary structure dictates a position of the actuation cam, wherein the actuation cam disengages with a top surface of the stationary structure when the vehicle seating assembly is in at least one of the first non-use state and the second non-use state, wherein engagement between the actuation cam and the top surface of the stationary structure places the actuation cam in a position that provides a force to the cable that counter-acts the biasing of the lockout cam to the engaged position; and
a cable that extends between the actuation cam and the lockout cam such that the position of the actuation cam influences whether the lockout cam is in the engaged position or a disengaged position, wherein disengagement of the actuation cam with the top surface of the stationary structure causes a slackening of the cable that extends between the actuation cam and the lockout cam, and wherein such slackening of the cable allows the biasing of the lockout cam to place the lockout cam in the engaged position.

12. The vehicle seating assembly of claim 11, wherein the stationary structure is at least a portion of a track assembly to which the vehicle seating assembly is mounted.

13. The vehicle seating assembly of claim 11, wherein the first non-use state results in actuation of a track release button and an interlock release button of a track assembly to which the vehicle seating assembly is mounted.

14. The vehicle seating assembly of claim 13, wherein the second non-use state results in actuation of the interlock release button.

15. The vehicle seating assembly of claim 11, wherein the first non-use state places the seatback in a position that prevents occupancy of the vehicle seating assembly, and wherein the second non-use state places the seat in a position that prevents occupancy of the vehicle seating assembly.

* * * * *